May 21, 1963 — H. E. ROLFE, JR — 3,090,329
CARGO BRACING EQUIPMENT
Filed May 25, 1959 — 2 Sheets-Sheet 1
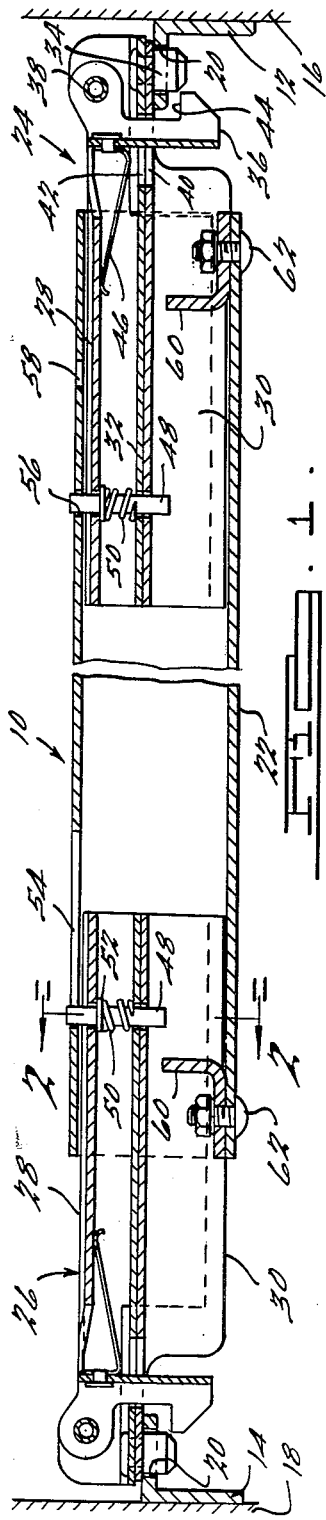
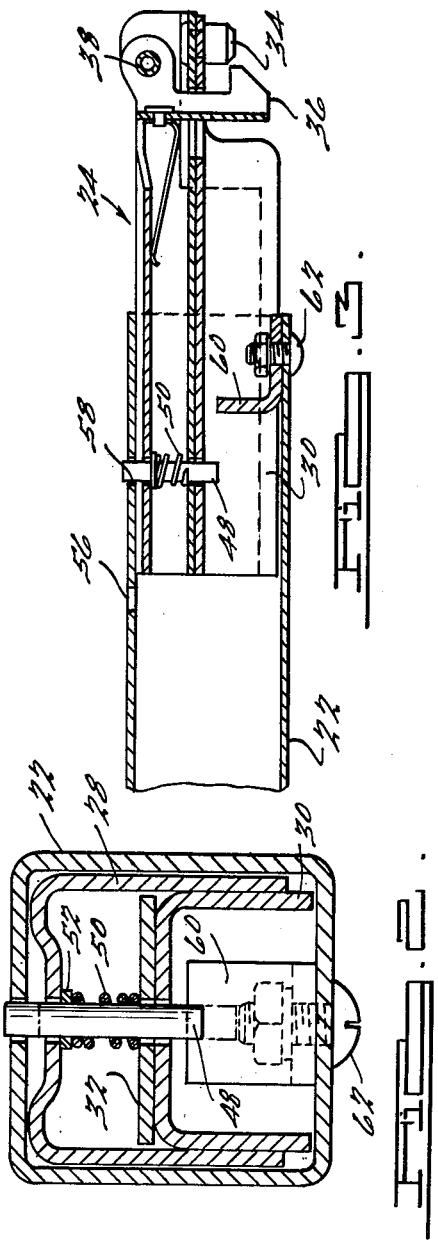
INVENTOR.
Herbert E. Rolfe, Jr.
BY
Harness, Dickey & Pierce
ATTORNEYS.

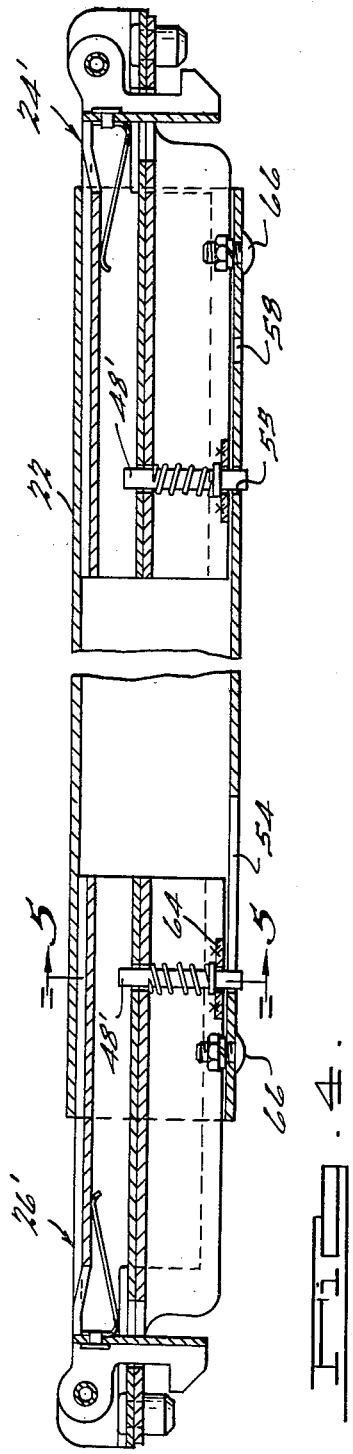

United States Patent Office 3,090,329
Patented May 21, 1963

3,090,329
CARGO BRACING EQUIPMENT
Herbert E. Rolfe, Jr., Garden City, Mich., assignor to Evans Products Company, Plymouth, Mich., a corporation of Delaware
Filed May 25, 1959, Ser. No. 815,423
2 Claims. (Cl. 105—369)

The present invention relates to cargo bracing equipment for use in supporting and bracing freight in trucks, railway freight cars, ships or other freight storing chambers. In particular, the present invention relates to an improved crossbar for supporting and bracing freight in such freight storing chambers.

Freight bracing crossbars of the type to which the present invention relates are provided with end fittings at the opposite ends thereof for ready attachment to and release from cooperating supporting members mounted on the walls or other surfaces defining the freight receiving chamber. In previously known crossbars of this type, one of these end fittings is mounted for free telescopic movement relative to the body of the crossbar. This permits a free variation in the effective length of the crossbar within certain specific limits, both to permit attachment of the bar to supports of slightly different spacing and to permit the use of the bar in installations in which the distance between these supports may change after the bar is in place. It is well-known that in the normal use of trucks and freight cars the walls move relative to each other, one common illustration of this being the bulging of the walls which takes place in freight cars during the switching and bumping of cars. Particularly in trucks the spacing of the supports to which the ends of the crossbars are attached may vary, between different trucks, more than can be accommodated by the telescopic mounting of the end fitting at one end of the bar. For this reason it has previously been necessary to have different crossbars to accommodate the different spacings of the supports.

It is an object of the present invention to provide an improved and universal crossbar which may be readily adjusted for use between supports having substantially different spacings.

It is a further object of the present invention to provide an improved crossbar of this type in which the end fittings at the opposite ends of the crossbar are of identical construction.

Another object of the invention is to provide an improved crossbar construction in which the crossbar has an elongated body having a socket portion and including an end fitting having a shank portion extending into the socket and carrying pin means adapted to project into an aperture provided in the socket portion for connecting the end fitting to the crossbar body.

It is also an object of the present invention to provide an improved construction of the just mentioned type in which the socket portion includes a fixed stop and in which the pin carried by the shank of the end fitting is movable between a first position in which it extends into an aperture in the socket portion and a second position in which it is withdrawn from the socket portion aperture and in which it interferes with the stop to prevent withdrawal of the end fitting from the socket.

Other and more detailed objects of the present invention will be apparent to those skilled in the art from a consideration of the following specification, the appended claims, and the accompanying drawings wherein:

FIGURE 1 is a broken longitudinal sectional view of a crossbar constructed according to the present invention;
FIGURE 2 is an enlarged sectional view of the structure illustrated in FIGURE 1, taken substantially along the line 2—2 thereof;
FIGURE 3 is a broken longitudinal view similar to the right-hand portion of FIGURE 1, showing the end fitting in a different position of adjustment than that shown in FIGURE 1;
FIGURE 4 is a longitudinal sectional view similar to FIGURE 1 of a crossbar embodying a modified form of the present invention;
FIGURE 5 is an enlarged transverse sectional view of the structure illustrated in FIGURE 4, taken substantially along the line 5—5 thereof; and,
FIGURE 6 is an enlarged broken sectional view showing a further modified form of the present invention.

Referring to FIGURES 1, 2 and 3 of the drawings and initially to FIGURE 1 thereof, the crossbar generally indicated at 10 is adapted to be connected between belt rails 12 and 14 mounted on walls 16 and 18 which may be, for example, the opposite inner side walls of a truck or railway freight car. These belt rails, in the form here illustrated, are angles having flanges projecting generally at right angles to the walls upon which they are mounted and provided with a plurality of apertures 20 spaced longitudinally therealong. As indicated above, the distance between the inner walls varies both in railway freight cars and in trucks, and it has previously been the practice to provide different length crossbars for these differing widths.

While crossbars having freely telescoping end fittings at both ends have been tried in the past, these have been found unsatisfactory because this construction leaves the elongated bar body free to shift transversely of the car. This has been found to be particularly disadvantageous in crossbar constructions in which the bar body includes means for connecting other dunnage to it such, for example, as crossbar constructions including an outer portion formed of wood to permit nailing to the bar body. Even in constructions in which other dunnage is not secured to the crossbar body, a free floating crossbar body permits and in some cases adds to the likelihood of transverse shifting of the cargo.

It will be appreciated from a complete understanding of the present invention that the improvements thereof may be readily embodied in crossbars of widely differing types and constructions. In an illustrative but not in a limiting sense, improvements of the present invention are herein illustrated and described as embodied in a crossbar of the general construction illustration and described in greater detail in the co-pending application, Serial No. 753,380 filed August 5, 1958, by Henry Lee Dunlap and assigned to the assignee of the present application, now Patent No. 3,029,746 dated April 17, 1962.

The crossbar 10 generally comprises an elongated tubular bar body 22 which is rectangular in cross section, as best illustrated in FIGURE 2, and which carries end fittings 24 and 26 mounted at opposite ends thereof which are adapted for connection to the belt rails 12 and 14 at the opposite sides of the truck, railway car or other freight storing chamber. The end fittings 24 and 26 are of identical construction and are formed of interfitting downwardly opening channels 28 and 30 (see FIGURE 2) which are welded or otherwise suitably secured together. Additional strength is provided by a plate 32 extending transversely and longitudinally of the bar and secured as by welding to the web of the inner channel 30. At its outer end each end fitting 24 and 26 is provided with means for attaching the end fitting to one of the belt rails 12 and 14, which attachment means includes a pair of pins 34 extending downwardly from the web portion of the inner channel 30 and a channel shaped latch 36 pivotally mounted on the spaced legs of the outer and upper channel 28 by a transversely extending roll pin 38. The latch 36 extends downwardly through aligned openings 40 and 42 in the web of the lower channel 30 and the plate 32, respectively, and has a hook portion 44 adapted to engage the under side of the flange on the belt rail to prevent disengagement of the pins 34 from the apertures 20 in the belt rail flange. The latch 36 is urged to and yieldably held in the latched position illustrated in the drawings by a spring 46 secured to the web of the channel-shaped latch 36 and engaging the web of the end fitting channel 28.

In accordance with the present invention, each end fitting is provided with a pin 48 which extends through aligned apertures in the plate 32 and in the webs of the channels 28 and 30 and is urged outwardly by a coil spring 50 which encircles the pin 48 between the plate 32 and the web of the upper channel 28. The lower end of the pin 48 engages the upper surface of the plate 32 and the upper end of the spring 50 engages a collar 52 (best illustrated in FIGURE 2) brazed or otherwise suitably secured to the pin 48. At the left-hand end of the crossbar, as viewed in FIGURE 1, the tubular crossbar body 22 is provided with an elongated slot 54 into which the outer end of the pin 48 is urged and in which it is yieldably held by the spring 50. It will be appreciated that the engagement of the pin 48 in the slot 54 provides for freely telescoping movement of the end fitting 26 relative to the bar body 22.

In the right-hand end of the crossbar, as viewed in FIGURE 1, the tubular bar body 22 is provided with a pair of longitudinally spaced apertures 56 and 58 adapted to receive the outer end of the pin 48 carried by the end fitting 24. It will be appreciated that this construction permits the end fitting 24 to be adjusted between the positions illustrated in FIGURES 1 and 3, but that in each of these positions the bar body 22 is held against movement relative to the end fitting 24.

The bar body 22 is provided at the opposite ends thereof with angle-shaped stops 60 removably secured within the tubular bar body 22 by bolts 62. The stops 60 are disposed on the center line of the bar body midway between the depending flanges of the end fitting channels 28 and 30, as best illustrated in FIGURE 2.

It is a feature of the present invention that the pins 48 are of a length such that, when the pins 48 are pressed inwardly against the action of the spring 50 to the dotted line position illustrated in FIGURE 2, in which the outer end of the pin is withdrawn from the slot 54, or the aperture 56 or 58, the inner end of the pin 48 will overlap the stop 60 as best illustrated in FIGURE 2, to prevent inadvertent removal of the end fitting from the bar body 22. It will be appreciated that when desired in the servicing of the bar, the stop 60 may be removed to permit withdrawal of the end fitting from the bar body for replacement or other service.

In the modified form of the applicant's invention illustrated in FIGURES 4 and 5, the construction there illustrated differs from that illustrated in FIGURES 1 to 3, inclusive, in that the pin 48' of the embodiment illustrated in FIGURES 4 and 5, does not extend through the web of the upper and outer channel 28 but rather, extends downwardly from the plate 32 and the web of the inner lower channel 30 and is transversely supported adjacent its lower end in a rectangular plate 64 extending between and secured as by welding to the depending flanges of the inner channel 30 adjacent their lower ends. In this form the spring 50' is disposed between the web of the inner channel 30 and the plate 64, the upper end of the spring 50' engaging the lower surface of the web of the channel 30 and the lower end engaging the collar 52' secured to the pin 48'. It will be appreciated from a comparison of the structure illustrated in FIGURES 4 and 5 with the above described construction illustrated in FIGURES 1 to 3, inclusive, that in FIGURES 4 and 5 the bar body 22 is inverted relative to its position in the previously described embodiment.

The embodiment illustrated in FIGURES 4 and 5 further differs from the first described embodiment in that, in place of the angle-shaped stops 60, only a stop bolt 66 is employed. These bolts are mounted so that their inner ends and the nuts carried thereby are disposed in the path of movement of the plate 64 and thus serve to prevent inadvertent removal of the end fittings 24' and 26' when the pins 48' thereof are pressed inwardly to withdraw them from the slot 54 or the apertures 56 or 58.

FIGURE 6 illustrates a possible further modified construction from which it will be seen that with an end fitting of the construction illustrated in FIGURES 4 and 5, the slot 54 may be omitted if desired and the end fitting 26' will freely telescope relative to the tubular crossbar body 22', during which movement the outer end of the pin 48' will slide along the inner surface of the tubular end fitting 26' against which it is held by the action of the spring 50'. Inadvertent removal of the end fitting 26' from the crossbar body 22' is prevented by the stop bolt 66.

It will now be appreciated that the present applicant has provided an improved crossbar construction in which the end fittings at the opposite ends of the crossbar may be of identical construction and which incorporates a very simple and advantageous construction permitting one of the end fittings to be mounted for free telescopic movement relative to the crossbar body and permitting the end fitting at the opposite end to be selectively secured in a plurality of adjusted positions spaced longitudinally of the bar body. It will be further appreciated that the construction provided by the applicant permits adjustment of the fixed end fitting between these plurality of spaced end positions to be very readily made.

While only certain specific embodiments of the invention have been illustrated and described herein, it will be readily appreciated by those skilled in the art that numerous modifications and changes may be made without departing from the spirit of the present invention.

What is claimed is:

1. A crossbar for use in supporting and bracing freight in freight receiving chambers having substantially differently spaced supports and adapted in each of said chambers to accommodate itself to minor variations in the spacing between the supports therein, said crossbar being adapted to extend between and be connected to said supports and comprising an elongated bar body having a socket at each end thereof, one of said sockets having a longitudinally extending slot at one side thereof communicating with the interior thereof and the other of said sockets having a pair of longitudinally spaced apertures at one side thereof communicating with the interior thereof, a pair of identical end fittings each having a shank telescopically received in one of said sockets, pin means carried by said shank of each end fitting and movable laterally of said shank to and from an extended operative position in which said pin means of the one of said end fittings which has its shank received in said one of said sockets projects into said slot and is adapted to engage said one of said sockets at the opposite ends of said slot to limit telescopic movement of said one of said end fittings relative to said one of said sockets and wherein said pin means of the other of said end fittings, the shank of which is received in said other of said sockets extends into one of said longitudinally spaced apertures for selectively connecting said other of said end fittings to said other of said sockets in positions spaced longitudinally thereof, said pin means also being movable to a retracted position such that said other of said end fittings when said pin means thereof is in said retracted position may be moved to move the shank thereof telescopically relative to said other of said sockets between positions in which said pin means is aligned with said apertures.

2. A crossbar as defined in claim 1 including stop means mounted on said bar body at at least one end thereof and engageable with said pin means of the one of said end fittings at said one end of said bar body when said pin means is in said retracted position to prevent withdrawal of the shank of said last mentioned end fitting from the one of said sockets in which it is received.

References Cited in the file of this patent

UNITED STATES PATENTS

| | | |
|---|---|---|
| 1,781,318 | Byington | Nov. 11, 1930 |
| 1,820,950 | Schulstadt | Sept. 1, 1931 |
| 2,462,619 | Eisensmith | Feb. 22, 1949 |
| 2,608,420 | Eck | Aug. 26, 1952 |
| 2,627,821 | Sjogren | Feb. 10, 1953 |
| 2,725,826 | Tobin et al. | Dec. 6, 1955 |
| 2,800,737 | Crossan | July 30, 1957 |
| 2,837,039 | Schueder | June 3, 1958 |